United States Patent [19]

Smith

[11] Patent Number: 5,026,003

[45] Date of Patent: Jun. 25, 1991

[54] LIGHTER-THAN-AIR AIRCRAFT

[76] Inventor: William R. Smith, R. R. 2 Box 306, Godfrey, Ill. 62035

[21] Appl. No.: 399,260

[22] Filed: Aug. 28, 1989

[51] Int. Cl.$^5$ .................. B64B 1/34; B64B 1/22; B64B 1/06; B64D 9/00

[52] U.S. Cl. .................. 244/26; 244/127; 244/137.1; 244/30

[58] Field of Search .............. 244/25, 26, 125, 127, 244/128, 137.1, 96–98, 94, 93, 58, 120, 126, 135 C, 24, 30

[56] References Cited

U.S. PATENT DOCUMENTS

| | | | |
|---|---|---|---|
| Re. 28,454 | 6/1975 | Fitzpatrick et al. | 244/25 |
| 552,443 | 12/1895 | Pennington | 244/25 |
| 998,554 | 7/1911 | Schleicher | 244/25 X |
| 1,243,556 | 10/1917 | Reynolds et al. | 244/94 |
| 1,270,971 | 7/1918 | Richmond | 244/26 |
| 1,608,822 | 11/1926 | Silver | 244/25 |
| 1,648,935 | 11/1927 | Campau | 244/97 |
| 1,753,068 | 4/1930 | Ross | 244/26 |
| 2,070,854 | 2/1937 | Boyes | 244/125 X |
| 2,327,145 | 8/1943 | Van Gieson | 244/26 |
| 3,856,238 | 12/1974 | Malvestuto, Jr. | 244/26 X |

FOREIGN PATENT DOCUMENTS

| | | | |
|---|---|---|---|
| 201309 | 11/1986 | European Pat. Off. | 244/26 |
| 13608 | 12/1909 | United Kingdom | 244/25 |
| 21465 | 12/1909 | United Kingdom | 244/26 |

Primary Examiner—Johnny D. Cherry
Assistant Examiner—James M. Kannofsky
Attorney, Agent, or Firm—Gravely, Lieder & Woodruff

[57] ABSTRACT

A lighter-than-air aircraft includes a rigid platform having cargo and passenger compartments and gas bags attached to the platform for holding a gas having a density less than air, thus imparting lift to the platform. The bags are arranged in pairs, there being a pair of spaced apart upper bags along the upper surface of the platform and a pair of spaced apart lower bags along the lower surface. While the bags cover portions of the upper and lower surfaces, both surfaces remain exposed along the longitudinal centerline of the platform, and here the platform is provided with vertical ducts and bays. The ducts house motors and propellers which drive air through the ducts and thus impart a vertically directed force to the platform. The bays hold containers which are lowered from and raised into the bays with a crane that moves along tracks extended along the upper surface of the platform. Along the sides of the platform are nacelles which house motors and propellers for providing the thrust to propel the aircraft in flight. The nacelles tilt so that the thrust derived from them may be used to change the elevation of the aircraft. Rudders for controlling the direction of flight are in the regions between the upper gas bags and in the regions between the lower gas bag. The motors in the ducts and nacelles may be electric, with the electrical energy for driving them being derived from a motor-generator set in one of the containers.

27 Claims, 5 Drawing Sheets

LIGHTER-THAN-AIR AIRCRAFT

BACKGROUND OF THE INVENTION

This invention relates in general to aircraft and more particularly to a lighter-than-air aircraft.

The transportation system of this country offers a variety of conveyances for moving goods and passengers from one location to another, and the conveyance one chooses to a large measure depends on what is to be transported and the origin and destination of the trip. Certainly, fixed wing aircraft constitute the quickest practical mode of delivering goods and passengers from one location to another, provided that each location has a suitable airport, but airports capable of accommodating large fixed wing aircraft are widely dispersed, leaving many regions of the country without access to this mode of transportation. Railroads, while passing through many communities, have transfer facilities only at scattered locations. Boats and ships of course only service ports having adequate docking facilities. Trucks and passenger vehicles can service any location to which a road leads, but the capacities of these conveyances are limited.

The present invention resides in a large lighter-than-air aircraft which has the capacity to carry large cargo or numerous passengers over both land and sea and to receive and discharge such cargoes at practically any cleared site of modest size. It includes a platform to which a pair of upper gas bags and a pair of lower gas bags are attached, and these bags contain a gas having a density less than air so that the bags impart lift to the platform. The platform has bays which hold containers and also has ducts in which propellers and motors are located to impart a vertically directed force to the platform. Along the sides of the platform nacelles are attached, and they contain propellers and motors for propelling the aircraft forwardly.

DESCRIPTION OF THE DRAWINGS

In accompanying drawings which form part of the specification and wherein like numerals and letters refer to like parts wherever they occur.

DETAILED DESCRIPTION

Referring now to the drawings, a lighter-than-air aircraft A (FIGS. 1-4) basically includes a structural platform 2, two upper gas bags 4 attached to the top of the platform 2 and two lower gas bags 6 attached to the bottom of the platform 2. The platform 2, which is rigid, gives the aircraft A its basic shape and provides a rigid structure to which just about every other component of the aircraft A is attached, including the gas bags 4 and 6. The bags 4 and 6 contain an inert gas having a density less than air, and perhaps the most suitable gas is helium. Being lighter than air, the helium within the bags 4 and 6 imparts lift to the aircraft A and enables it to remain aloft irrespective of whether or not it has velocity.

Considering the platform 2 in somewhat more detail (FIGS. 2-4), it extends the full length and width of the aircraft A and throughout is high enough to accommodate an individual standing. It is constructed in the form of a torque box from a nonmetallic composite material or from a light weight metal. As such, it contains a multitude of structural members which divide it into box-like compartments. Within the platform 2 exist rooms, passageways, and tanks for storing liquids such as fuel and water. Much of the interior of the platform 2 is devoted to compartments holding more helium gas to impart additiOnal lift. Some of the rooms simply accommodate passengers and crew, whereas others are used in the actual operation of the airship.

Figure 4:
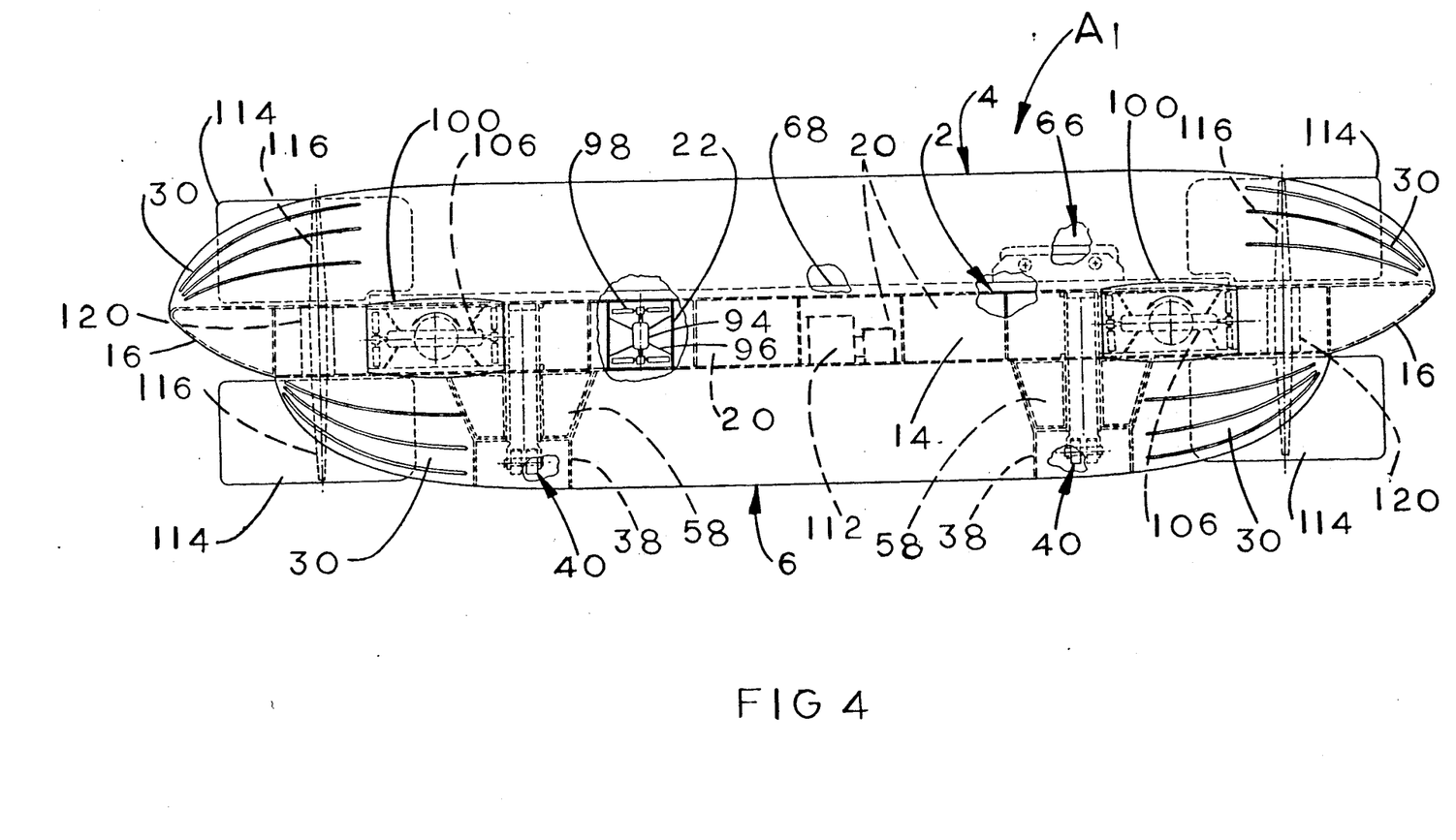
FIG. 4 is a side elevational view of the aircraft, partially broken away to show a duct containing a lift motor.
Figure 5:
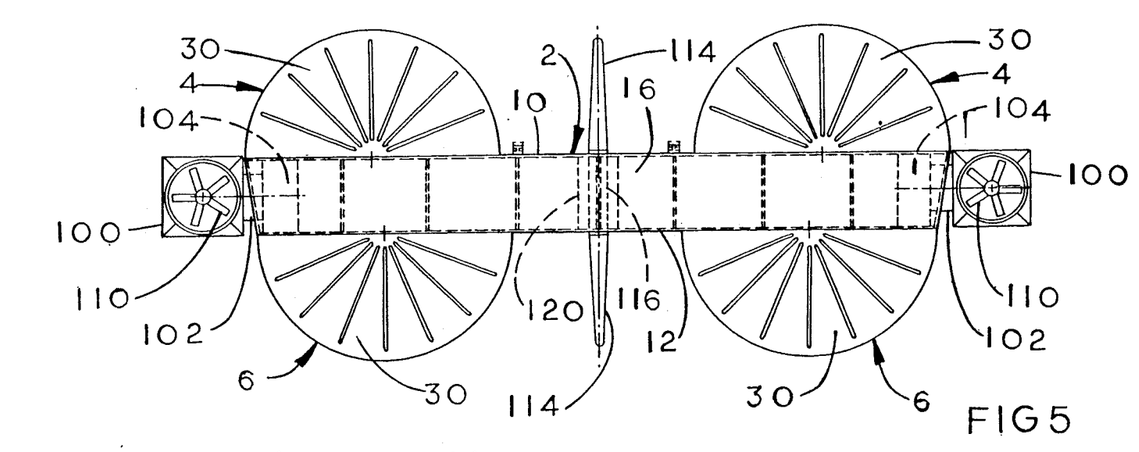
FIG. 5 is an end elevational view of the aircraft.
Figure 6:
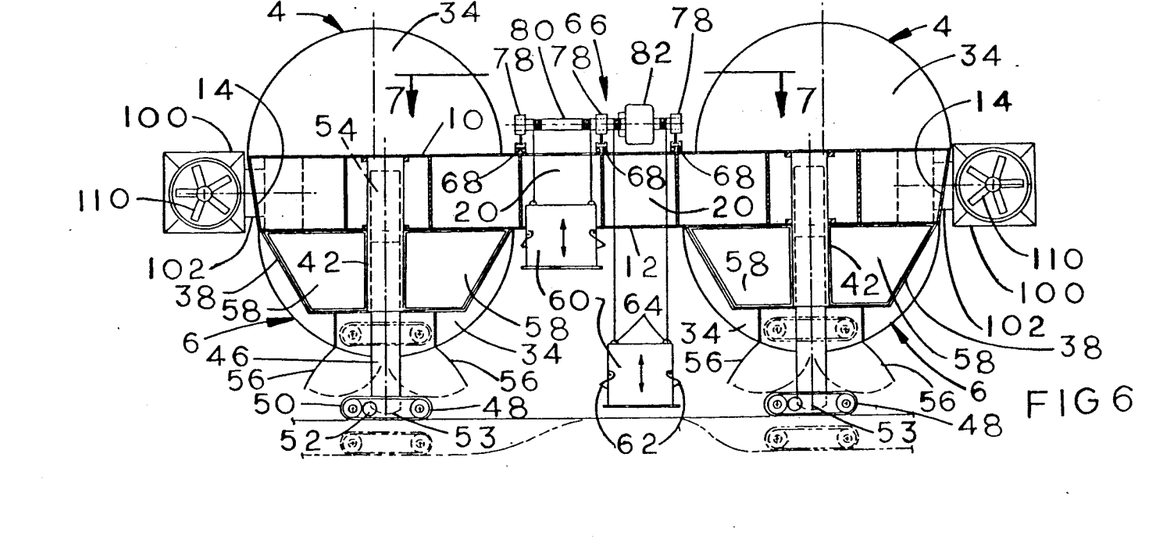
FIG. 6 is a sectional view of the aircraft taken along line 6—6 of FIG. 3.

The platform 2 possesses a generally rectangular shape, it being longer than it is wide and of generally uniform height. It has an upper surface 10, a bottom surface 12, side walls 14 and end walls 16. The side walls 14 are slightly canted so that their lower margins lie inwardly from their upper margins (FIGS. 5 & 6). The end walls 16 are raked at a much steeper angle (FIG. 4). Some of the passageways and rooms exist along the walls 14 and 16 and here the walls 14 and 16 are provided with windows.

The platform 2 has a longitudinal centerline x (FIGS. 1-3) which lies midway between its side walls 14 and likewise midway between the gas bags 4 and 6 of each pair, and along the centerline x, it has a series of cargo bays 20 (FIGS. 4 & 6) arranged in two rows with several cylindrical ducts 22 interposed among the bays 20 of each row. Above each bay 20 the upper surface 10 is interrupted with four apertures 24. The bays 20, which in effect are rectilinear cavities, open downwardly through the lower surface 12 of the platform 2. The ducts 22, on the other hand, pass completely through the platform 2, opening out of both the upper and lower surfaces 10 and 12.

Figures 1, 2:
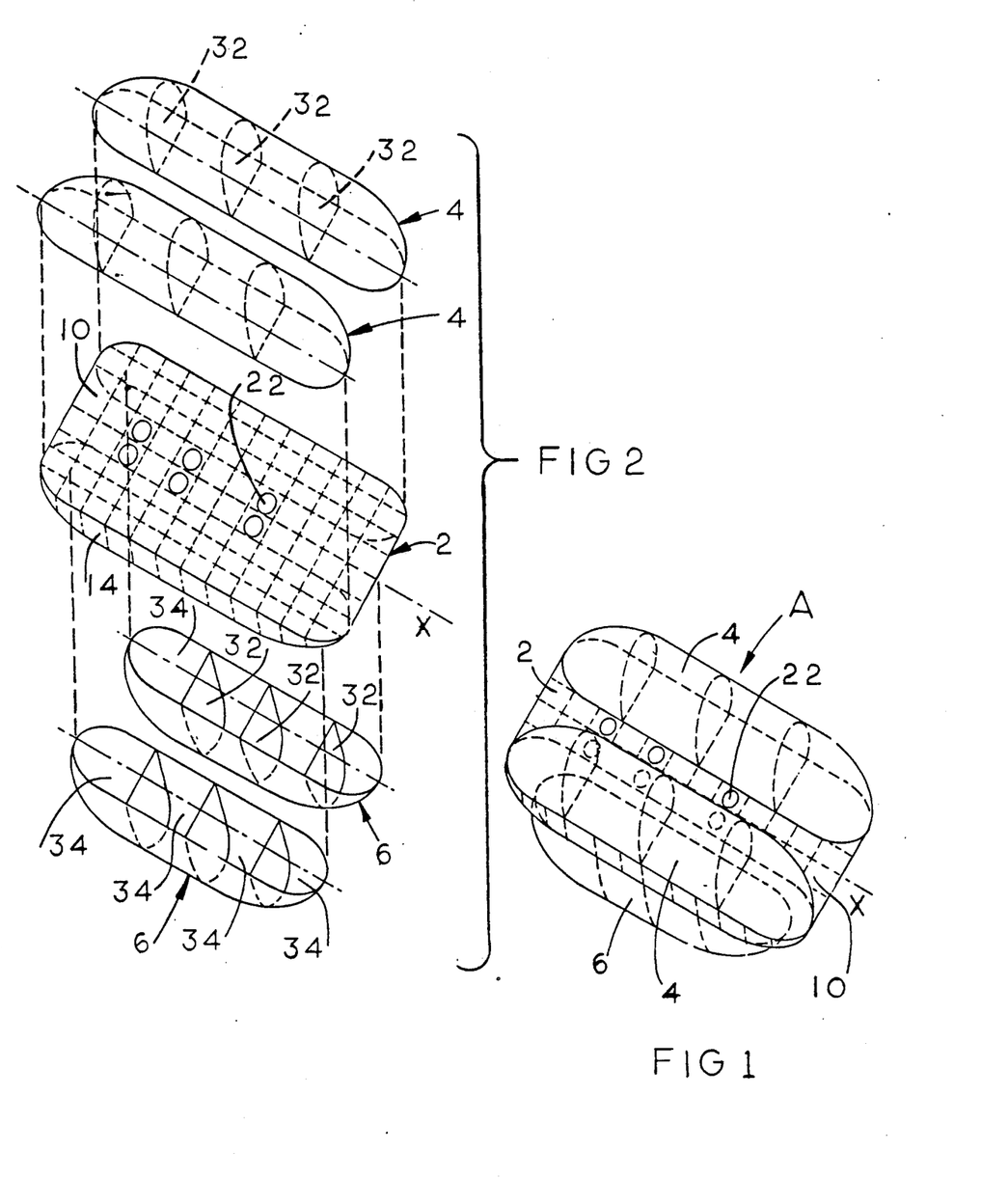
FIG. 1 is a perspective view of an aircraft constructed in accordance with and embodying present invention.
FIG. 2 is an exploded perspective view of the aircraft.

Each upper gas bag 4 is formed from a rigid material, preferably a nonmetallic material such as fiberglass and armid fibers bonded to an impervious film, such as Mylar film, which serves as a gas barrier for the bag 4, keeping helium within it and air out of it. At its ends each bag 4 has rigid noses 30 (FIGS. 4 & 5) formed from a nonmetalic material such as fiberglass and armid fibers. The noses 30 reinforce the upper bags 4 and enable them to withstand the heavy air loads encountered in high speed flight. Within each bag 4 are impervious partitions 32 which divide the bag 4 or 6 into several compartments 34 arranged one after the other along the length of the bag 4 (FIG. 2).

In contrast to the upper bags 4, the lower bags 6 are formed from a rigid material, preferably a nonmetallic material such as fiberglass and armid fibers bonded to an impervious film, for example Mylar film. The front and rear ends of the bags 6 are likewise curved in the form of noses 30. Being rigid, the lower bags 6 withstand the upwardly directed force of atmospheric air—that is the lifting force—and wind loads as well. Like the bags 4, the bags 6 contain partitions 32 which divide it into compartments 34 (FIG. 2).

The lift imparted by the helium in the compartments 34 of the four gas bags 4 and 6 and in the compartments of the platform 2 to a large measure depends on the density of the helium within them, and the density of the helium may be changed. To this end, the platform 2 carries several tanks 36 (FIG. 3) in which helium gas is maintained under considerable pressure. The tanks 36 are connected to the compartments 34 of the bags 4 and 6 and to the compartments in the platform 2 through lines containing valves, so that helium from the tanks 36 may be directed to those compartments. The lines also pass through pumps, which in effect shunt the valves. These pumps have the capacity to withdraw helium from the compartments 34 of the bags 4 and 6 and from the helium compartments of the platform 2 and force it back to the tanks 36. They thus must elevate the pressure of the helium sufficiently to overcome the pressure of the helium that is within the tanks 36. In order to increase the density of the helium within the bags 4 and 6 and within the compartments of the platform 2—and thereby reduce its lifting capacity—the valves are opened to admit more helium to the compartments. On the other hand, when it is desired to increase lift, the pumps are energized to withdraw helium from the compartments and thereby decrease the density of the helium that remains. The tanks 36 also serve to resupply helium lost from the bags 4 or 6 due to leakage.

In the alternative, the density of the helium in the bags 4 and 6 and helium compartments of the platform 2 may be varied with ballonets which are in effect expandable chambers within the compartments 34 of the bags 4 and 6 and the compartments of the platform 2. Each ballonet is connected to a source of compressed air. When air is forced into a ballonet, the ballonet expands and thereby increases the density of the helium within its compartment. This reduces the lifting capacity of the helium. Similarly, when the ballonets are vented, they contract and the density of helium decreases, thus increasing its lifting capacity.

Figure 3:
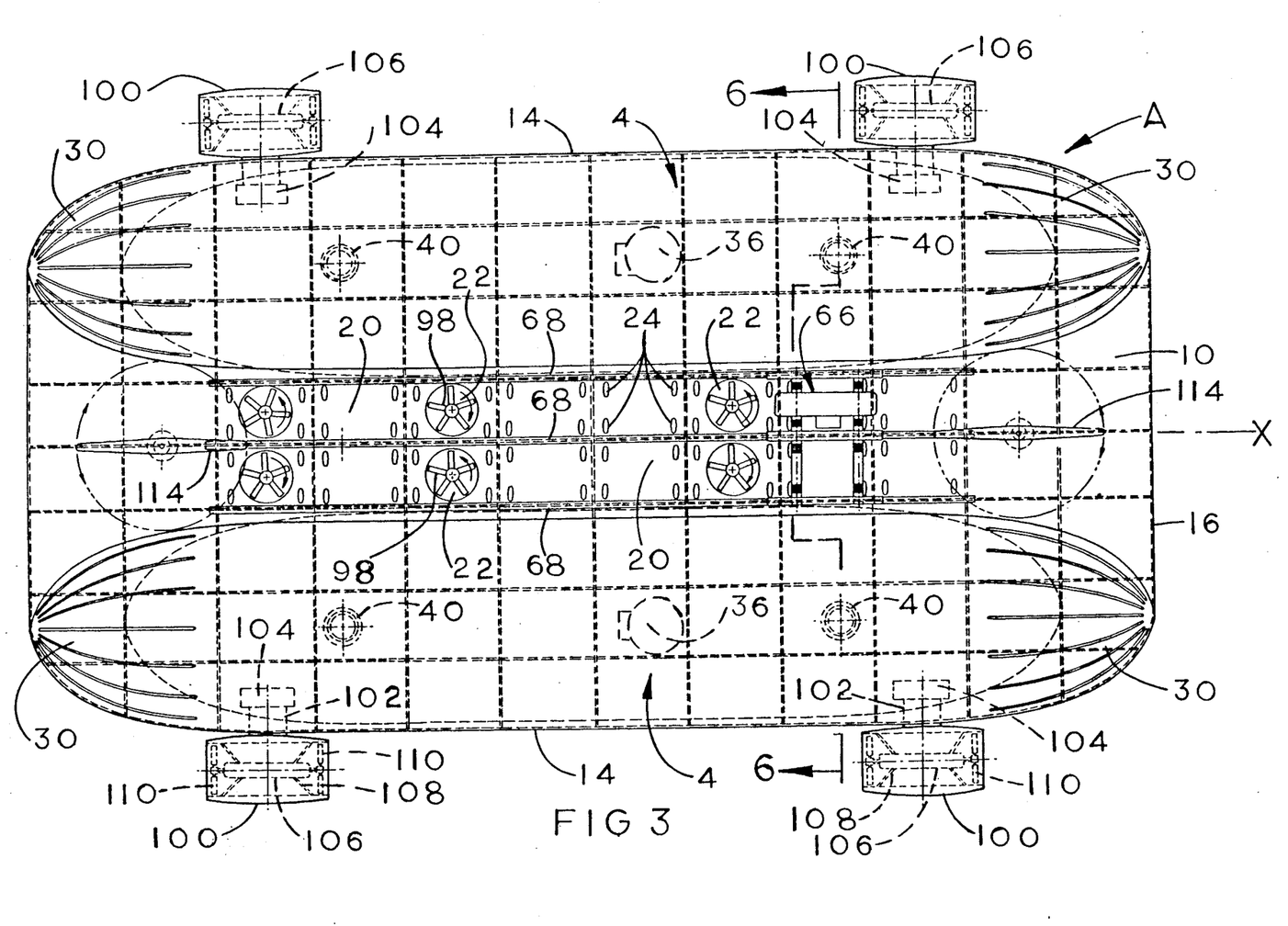
FIG. 3 is a top plan view of the aircraft.

The two upper gas bags 4 cover most of the upper surface 10, with one bag 4 extending out to one side wall 14 and the other extending to the opposite side wall 14 (FIGS. 3 & 5). Yet the upper bags 4 are separated along the longitudinal centerline x of the platform 2, so they do not obstruct the ducts 22 or the apertures 24 that open into the bays 20. Indeed, the bags 4 lie laterally beyond the ducts 22. The bags 4 extend the full length of the platform 2, and at the ends of the platform 2 their noses 30 merge into the steeply raked end walls 16 of the platform 2.

The two lower bags 6 likewise extend out to opposite sides of the platform 2 so that the lower surface of the platform 2 remains exposed between them (FIG. 5 & 6). Indeed, the lower bags 6 must not obstruct the bays 20 or the ducts 22 that lie along the longitudinal centerline x. The noses 30 of the two lower bags 6 extend out to the raked end walls 16 of the platform 2, and by reason of the inclination of those walls, the bags 6 are shorter than the upper bags 4 (FIG. 4).

The lower gas bags 6 are not continuous, but instead are interrupted by housings 38 (FIGS. 4 & 6), there being two housings 38 in each bag 6, one near the front nose and the other near the rear nose. Each housing 38 is formed from rigid and impervious walls, it being somewhat wider at its top than at its bottom and flaring outwardly between its two ends. Indeed, the housings 38 extend from the platform 2 all the way to the bottom surfaces of their respective bags 6. The interiors of the housing 38 are isolated from the interiors of the bags 6 and contain air at atmospheric pressure.

The housings 38 contain landing gear 40 (FIG. 4 & 6) which will support the platform 2 in an elevated position above the underlying terrain, indeed at an elevation high enough to prevent the lower gas bags 6 from contacting the terrain. The landing gear 40 have the capacity to retract, and when retracted they are contained entirely within their respective housings 38. However, when extended they project below the bags 6.

To this end, each landing gear 40 includes a large guide tube 42 (FIG. 6) which at its upper end is anchored firmly in the platform 2. The guide tube 42 projects downwardly from the platform 2 into the underlying housing 38 which stabilizes it, and within the housing 38 receives a strut 46 which projects downwardly below the lower end of the tube 42. Here the strut 46 is fitted with a track assembly 48, including an endless track 50 and an electric motor 52 that is capable of driving the track 50. The track assembly 48 normally lies with its tracks 50 oriented transversely with respect to the centerline x, but the track assembly 48 has an actuator 53 for turning it on the strut 46 so that all four track assemblies 48 can rotate to a desired direction. The strut 46 is extended and retracted with a hydraulic cylinder 54. When retracted, the track assembly 48 is within its housing 38. However, when the strut 46 is extended, the track assembly 48 is presented below the lower surface of the bag 6 where its track 50 will bear against the terrain, and this enables that particular landing gear 40 to support the aircraft A on the terrain. Each housing 38 is fitted with doors 56 which close, when the track assembly 48 for the housing 38 is retracted, and when closed the doors 56 lie flush with the undersurface of the bag 6.

The upper regions of the housing 38 flare outwardly and here the housings 38 contain tanks 58 for holding water and fuel (FIG. 6). The tanks 58 encircle the guide tubes 42 for the landing gear 40 and thereby serve as braces for rigidifying those guide tubes 42. Being located below the platform 2, the tanks 58 lower the center of gravity for the aircraft A, and thereby impart stability. By shifting fluids between tanks 58, it is possible to maintain precise control over the horizontal trim of the aircraft A.

Each of the bays 20 has the capacity to hold a container 60 (FIG. 6) which is of sizable dimensions. Indeed, each container 60 completely fills the bay 20 to which it is assigned and has a bottom wall which lies flush with the lower surface 12 of the platform when fully received its bay 20. The containers 60 serve a multitude of purposes, but perhaps their primary purpose is to hold cargo, and most are assigned this use. However, some may be used as passenger rooms, while others may house equipment for supplying the power required to operate the aircraft A. The containers 60, are normally secured in their respective bays 20 with latches 62 which may be released to detach the containers 60. Each container 60 has four apertured lugs 64 at its upper end, and they align with the apertures 24 in the upper surface 10 of the platform 2.

Figure 7:
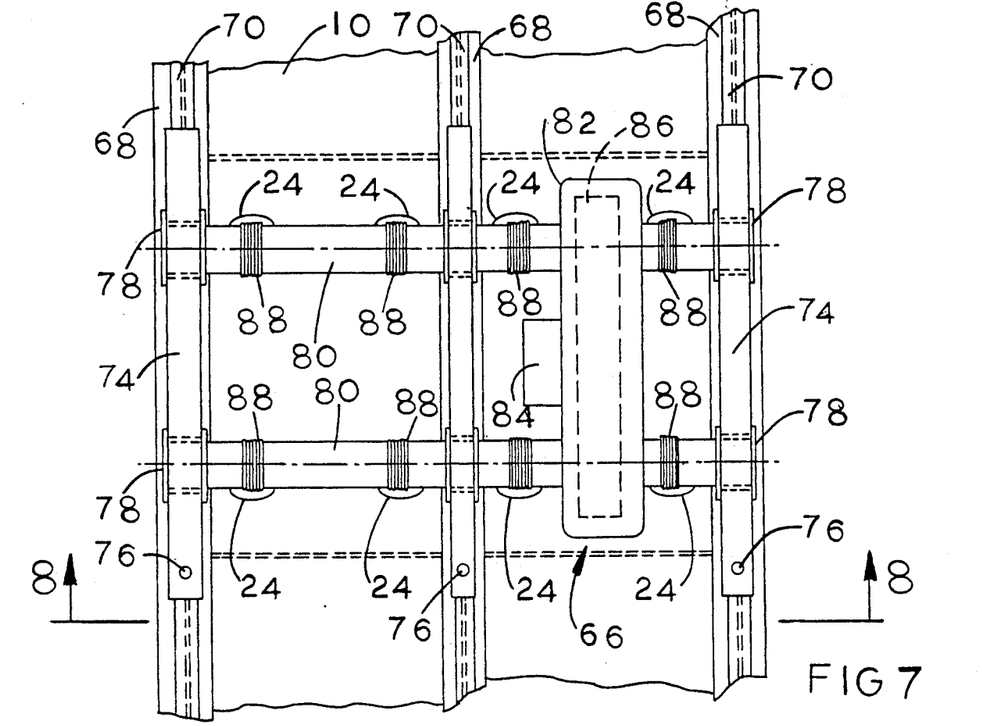
FIG. 7 is an enlarged plan view of the crane for the aircraft.
Figure 8:
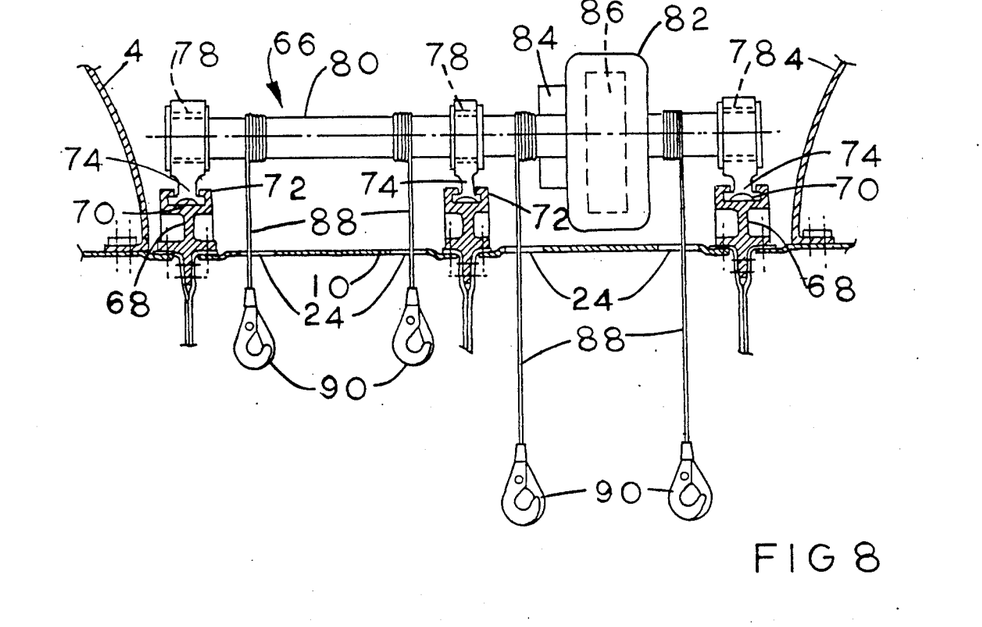
FIG. 8 is a sectional view taken along line 8—8 of FIG. 7.

In the region between its two upper gas bags 4 the aircraft A carries its own crane 66 (FIGS. 6–8) for raising and lowering the containers 60. In this regard, the platform 2 along its upper surface 10 in the region between the two upper gas bags 4 has three tracks 68, there being one between the two rows of bays 20 and the remaining two beyond the sides of the bays 20. The tracks 68 support the crane 66 which moves along them from one bay 20 to the next.

Each track 68 has a channel-shaped way 70 which is presented upwardly and includes flanges 72 which extend partially over the channel-shaped configuration. The crane 66 has three enlarged shoes 74 which are received in the channel-shaped ways 70 and indeed are captured in the ways 70 by the flanges 72. Actually, the capture only prevents the shoes 74 from lifting out of the ways 70, for the shoes 74 are free to move longitudinally along the tracks 68. To facilitate this movement, which is manual, each shoe 74 has a port 76 (FIG. 7) extended through it to its underside, and compressed air is introduced into this port to urge the shoe 74 upwardly as it moves. In other words, the compressed air reduces friction between the tracks 68 and the crane 66 to the extent the former moves easily along the latter simply under the application of a manual force. The crane 66 further includes bearings 78 mounted on the shoes 74 and two cross shafts 80 extended through the bearings 78. The cross shafts 80 lie parallel to each other and crosswise with respect to the tracks 68, and are spaced apart a distance less than the length of a bay 20. The two shafts 80 are connected by a housing 82 containing a motor 84 and gears 86. The motor 84, when engaged with the shafts 80, drives the shafts 80, with the torque generated by it being transmitted through the gears 86. The shafts 80 serve as winches, inasmuch as each has four wire ropes 88 wound around it, two on each side of the center track 68. Thus, when the crane 66 is positioned above a bay 20, four wire ropes 88 may be lowered into the bay 20 through the apertures 24 in the upper surface 10 of the platform 2. The wire ropes 88 at their free ends are fitted with hooks 90 which are designed to engage the apertured lugs 64 on the tops of the containers 60 (FIG. 6). Thus, when the airship A is supported on its landing gear 40, the four wire ropes 88 may be lowered through the apertures 24 at the top of that bay 20 over which the crane 66 is located, and the hooks 90 of those ropes 88 may be engaged with the lugs 64 on the container 60 in the bay 20. Once the latches 62 for the container 60 are released, the ropes 88 will lower the container 60 from the bay 20. Likewise, the ropes 88 will elevate a container 60 into the bay 20.

Each cylindrical duct 22 contains an electric motor 94 (FIG. 4) which is anchored to the platform 2 by a suitable harness 96, and the motor 94 at the ends of its shaft is fitted with variable pitch propellers 98. Depending on the pitch given to their propellers 98, the motors 94 may be used to supplement the lift provided by the gas entrapped within the bays 4 and 6 or to work against that lift and in effect function as ballast.

At four locations along its side walls 14, the platform 2 is fitted with nacelles 100 (FIGS. 3–6) which are carried on shafts 102 that project into the platform 2 where they are coupled with actuators 104 for turning the shafts 102. Normally, the nacelles 100 are oriented longitudinally of the platform 2, so that each nacelle 100 opens forwardly and rearwardly. However, when the actuators 104 turn the shafts 102, the nacelles 100 are tilted, and indeed they may be tilted to fully vertical positions and of course to intervening positions as well.

Each nacelle 100 contains an electric motor 106 (FIG. 3) which is held in place by a suitable harness 108. The shaft of the motor 106 at each of its ends is fitted with a variable pitch propeller 110. When the nacelles 100 are in the normal horizontal orientation, the motor 106 within them, drive the aircraft A forwardly or rearwardly. Moreover, when the nacelles 100 are in this orientation, the motors 106 may be used to turn the aircraft A, inasmuch as simply varying the pitch of the propellers 110 on opposite sides will head the aircraft A in a different direction. When the nacelles 100 are vertical, the propellers 110 may provide additional lift or force it downwardly. Intermediate positions are used to control the flight of the aircraft A, particularly its elevation.

The electrical energy for powering motors 106 that are within the nacelles 100 and the motors 94 within the ducts 22 derives from a motor-generator sets 112 (FIG. 4) contained in one or more of the containers 60. Preferably each set 112 includes an alternating current generator and a diesel or gas turbine engine for driving the generator.

The direction of flight for the aircraft A is to a large measure controlled by rudders 114 (FIGS. 3 & 5) which are carried on two rudder posts 116, one at each end of the platform 2. The posts 116 project above the platform 2 into the region between the upper bags 4, and in this region each is fitted with a rudder 114 which is actually a generally rectangular vane. The posts 116 also project below the platform 2 into the region between the lower bags 6, and in this region each post 116 is fitted with another rudder 114. Within the platform 2, the rudder posts 116 are connected to actuators 120 for rotating them, and thereby changing the angle of the rudders 114.

The motor-generator sets 112, the electric motors 94 within the ducts 22, the electric motors 106 in the nacelles 100, the actuators 104 that control the tilt of the nacelles 100, and the actuators 120 that control the angle of the rudders 114, are all operated from a control room within the platform 2. The same holds true for the valves and pumps that transfer helium between the compartments 34 of the bags 4 and 6 and the compartments of the platform 2, on one hand, and the helium tanks 36, on the other. The landing gear 40 is also operated from that location.

The airship A derives its lift primarily the helium within its bags 4 and 6 and the helium compartments of the platform 2. The density of that gas may be varied by transferring helium between the compartments and the tanks 36, and thus the lift imparted by the helium may be adjusted to accommodate the load and also to facilitate descent and ascent. The electric motors 94 in the ducts 22 of the platform 2 serve to supplement the lift imparted by the helium of the gas bags 4 and 6, and when the pitch of their propellers 98 is reversed the motors 94 assist in the descent. When the propellers 98 are configured to impart lift, they draw air over the domed upper surfaces of the two upper gas bag 4 and discharge it downwardly through the ducts 22. As a consequence, the velocity of the boundary layer of air across the upper bags 4 exceeds that along the lower bags 6, so the upper bags 4 function much like airfoils. Thus, the supplemental lift imparted by the motors 94 not only derives from the force exerted on the platform 2 by their propellers 98, but also from the airfoil effect caused by the air moving over the upper bags 4.

The motors 106 located in the nacelles 100 along the sides of the platform 2 provide the thrust for driving the aircraft A forwardly in the direction of flight. In this regard, the propellers 110, which are driven by the motors 106, draw air into the nacelles 100 and discharge it from the opposite ends of those nacelles, thus producing the thrust required to drive the aircraft A forwardly. By reversing the pitch of the propellers 110, the thrust is, of course, reversed, and this reduces the speed of the aircraft A and facilitates maneuvering for landing. The motors 106 may also be used to control the ascent or descent of the aircraft, for while their nacelles 100 normally operate in a horizontal orientation, they may be rotated to a vertical orientation where all of the thrust derived from the motors 106 is exerted vertically, or to intervening positions, where a portion of the thrust assists in ascent or descent.

During normal flight the landing gear 40 is retracted, that is to say the track assemblies 48 are contained entirely within the compartments 38 that extend through the lower gas bags 6. They thus do not impose any drag on the aircraft A. The inclination of the end walls 16 of the platform 2 also serves to reduce the drag, as does the curved shape of the noses 30 at the ends of the gas bags 4 and 6. The aircraft A cruises at velocities as high as 100 miles per hour and at these velocites the gas bags 4 and 6 experience a substantial wind load, notwithstanding curvature of their ends. The noses 30 reinforce the bags 4 and 6 at their leading and trailing ends, and resist the windload. The aircraft A changes elevation effectively without tilting the platform 2. It remains level at all times. The elevation for the aircraft A, being dependent primarily on the density of the helium and the thrust derived by the motors 94 in the ducts 22, may be varied by manipulating anyone of the foregoing. The trim is controlled by varying the density of the helium in the bags 4 and 6 and in the helium compartments of the platform 2 and by shifting liquids between the fuel and water tanks 58 of the four housings 38. The direction of flight is controlled by the angle of the rudders 114 and by varying the pitch of the propellers 110 in the nacelles 100.

The aircraft A does not require an extended runway to land, but instead only a simple cleared area somewhat larger than the aircraft A itself. Indeed, the cleared area need not even be level, and still the aircraft A will rest on it with its platform 2 in a generally horizontal orientation, inasmuch as the distance the track assemblies 48 project beyond the bottoms of the lower air bag 6 may be varied.

When the aircraft A approaches a landing site, the thrust from the propellers 110 in the nacelles 100 is reduced and ultimately reversed to stop the aircraft A above the landing site. Also, the doors 56 at the lower ends of the housings 38 are opened and the hydraulic cylinders 54 are energized to extend the track assemblies 48 below the lower gas bags 6. To effect the descent to the landing site, helium from the tanks 36 is admitted to the gas bags 4 and 6, and this of course increases the density of the helium in the bags 4 and 6 so that it imparts less lift. Also, the pitch of the propellers 98 for the motors 94 in the ducts 22 may be reversed to actually force the aircraft A downwardly. The to and fro maneuvers required to precisely align the aircraft with the landing site are derived from the motors 106 within the nacelles 100.

Once the endless tracks 50 of the landing gear 40 touch the ground, the aircraft A may be propelled over the ground with the motors 52 in track assemblies 48. When the aircraft A reaches the desired location, it should be tethered with lines extended between the platform 2 and ground anchors.

While on the ground, the aircraft A loads fuel and water which are simply pumped into appropriate tanks in the platform 2 and the tanks 58 in the landing gear housings 38. Compressed air is directed to the shoes 74 of the crane 66, and with its ropes 88 fully wound around the shafts 80, the crane 66 is moved to a bay 20 holding a container 60 scheduled for delivery to the landing site. When the crane 66 is directly above the bay 20, the compressed air is released and the motor 84 is energized to unwind the ropes 88 from their shafts 80. The hooks 90 at the ends of the ropes 88 pass through the apertures 24 in the upper surface 10 of the platform 2, and immediately below apertures 24, they are engaged with the lugs 64 on the top of the container 60 that is within the bay 20. After this, the motor 84 is energized for a short duration in the opposite direction to draw the ropes 88 taut. The latches 62, which hold the containers 60 in the bay 20, are released. Then the motor 84 of the crane 66 is again energized to lower the container 60 from the platform 2. Through an opposite sequence, a loaded container 60 is elevated into the bay 20 and secured with the latches 62. The crane 66 is then moved to the next bay 20 scheduled for loading or unloading.

Since the motor-generator set 112 is housed in one of the containers 60, it is a relatively simple matter to replace a motor generator set 112. After disconnecting the motor generator set 112 from the electrical circuitry of the platform 2, the container 60 containing the set 112 is simply lowered to the ground with the crane 66 and a container 60 containing another set 112 is elevated into the bay 20 and connected with the electrical circuitry.

This invention is intended to cover all changes and modifications of the example of the invention herein chosen for purposes of the disclosure which do not constitute departures from the spirit and scope of the invention.

What is claimed is:

1. An aircraft comprising: a rigid platform containing cavities and having a first extended surface that is presented outwardly; first gas bags attached to the platform at the first extended surface and projecting beyond the surface, the gas bags being spaced apart so that a portion of the surface is exposed between the bags; a gas within each bag, the gas having a density less than air; means on the platform for propelling the aircraft; ducts located within the platform in the region thereof that is between the bags; and means within the ducts for drawing air through the ducts so as to impart a vertically directed force to the platform.

2. An aircraft according to claim 1 wherein the platform has a second extended surface and further comprising second bags attached to the platform at the second extended surface, with the second bags being spaced apart so that the second extended surface is exposed between the second bags; and a gas with the second bags, the gas in the second bags also having a density less than air.

3. An aircraft according to claim 1 wherein the means for propelling includes nacelles located along the sides of the platform beyond the first extended surface and thrust means within the nacelles for driving air through the nacelles and discharging such air so as to create a thrust.

4. An aircraft according to claim 3 wherein the nacelles rotate relative to the platform so that the thrust imparted by the means within the nacelles is directed horizontally or at angles tot he horizontal.

5. An aircraft according to claim 1 and further comprising bays in the region of the platform that is between the gas bags and containers located in the bays.

6. An aircraft according to claim 1 and further comprising at least one rudder mounted on the platform between the gas bags for rotation about a generally vertical axis.

7. An aircraft according to claim 1 wherein the platform has rooms at its side and end walls and windows in the walls.

8. An aircraft comprising: a rigid platform containing cavities and having a first extended surface that is presented outwardly; first gas bags attached to the platform at the first extended surface and projecting beyond the surface, the gas bags being spaced apart so that a portion of the surface is exposed between the bags; bays in the region of the platform that is between the gas bags; containers located in the bays; a crane located on the platform above the bays for lowering the containers from the bays and elevating them into the bays; a gas within each bag, the gas having a density less than air; and means on the platform for propelling the aircraft.

9. An aircraft according to claim 8 wherein the bays are arranged in rows and the platform has tracks which pass above the rows; and wherein the crane is mounted on and moves along the tracks.

10. An aircraft comprising: a rigid platform containing cavities and having a first extended surface that is presented outwardly; first gas bags attached to the platform at the first extended surface and projecting beyond the surface, the gas bags being spaced apart so that a portion of the surface is exposed between the gas bags; bays in the region of the platform that is between the gas bags; containers located in the bays; a gas within each bag, the gas having a density less than air; and propelling means on the platform for propelling the aircraft, the propelling means including electric motors supported on the platform and a motor-generator set for generating electricity for driving the electric motors, the motor-generator set being in a container located in a bay of the platform.

11. An aircraft comprising: a rigid platform having a longitudinal centerline, sides on each side of the centerline, and ends extending between the sides, the platform also having an upper surface which extends between the sides and a lower surface which likewise extends between the sides, the platform being essentially hollow in the space between its upper and lower surfaces, so as to be capable of accommodating passengers, holding cargo, containing helium, or holding equipment; a pair of upper gas bags attached to the platform along its upper surface and covering a portion of the upper surface, but being spaced apart, so that another portion of the upper surface is exposed in the region of the longitudinal centerline; a pair of lower gas bags attached to the platform along its lower surface and covering a portion of the lower surface, but being spaced apart so that another portion of the lower surface is exposed between the lower gas bags; a gas within each gas bag, the gas having a density less than air, whereby the gas bags impart lift to the platform; propulsion means mounted on the platform along its sides for exerting a thrust on the platform so as to move the aircraft through the air; ducts located within the platform and extending between the upper and lower surfaces thereof, the ducts opening out of the upper and lower surfaces in the exposed regions between the gas bags; and means within each duct for drawing air into one end of the duct and discharging it from the other end so as to exert a vertically directed force on the platform.

12. An aircraft according to claim 11 wherein the platform contains bays in the region of its longitudinal centerline, and the bays open out of the platform between the lower gas bags; and further comprising containers located within the bays, the containers being detachable from the platform so that they can be removed from the bays.

13. An aircraft according to claim 12 wherein the platform has tracks along its upper surface in the region between the upper gas bags, with the tracks being generally parallel to the longitudinal centerline; and further comprising a crane mounted on and moveable along the tracks, the crane being capable of coupling with any one of the containers and lowering that container from its bay or raising a container into the bay.

14. An aircraft according to claim 13 wherein the crane includes a shoe at each track and each track has a way which fits around the shoe in that track so that the shoe cannot be detached from the track, yet may be moved along the track.

15. An aircraft comprising: a rigid platform having a longitudinal centerline, sides on each side of the centerline, and ends extending between the sides, the platform also having an upper surface which extends between the sides and a lower surface which likewise extends between the sides, the platform being essentially hollow in the space between its upper and lower surfaces, so as to be capable of accommodating passengers, holding cargo, containing helium, or holding equipment; a pair of upper gas bags attached to the platform along its upper surface and covering a portion of the upper surface, but being spaced apart, so that another portion of the upper surface is exposed in the region of the longitudinal centerline, the upper gas bags having curved noses at their ends; a pair of lower gas bags attached to the platform along its lower surface and covering a portion of the lower surface, but being spaced apart so that another portion of the lower surface is exposed between the lower gas bags, the lower gas bags having curved noses at their ends, the lower gas bags being shorter than the upper gas bags so that the upper gas bags project beyond the lower gas bags; a gas within each gas bag, the gas having a density less than air, whereby the gas bags impart lift to the platform; and propulsion means mounted on the platform along its sides for exerting a thrust on the platform so as to move the aircraft through the air.

16. An aircraft comprising: a rigid platform having a longitudinal centerline, sides on each side of the centerline, and ends extending between the sides, the platform also having an upper surface and a lower surface, the platform being essentially hollow in the space between its upper and lower surfaces, so as to be capable of holding cargo; a pair of upper gas bags attached to the platform at its upper surface, the upper bags being located generally inwardly from the sides of the platform, but being spaced apart, so that the upper surface of the platform is exposed in the region of the longitudinal centerline; a pair of lower gas bags attached to the platform at its lower surface, the lower bags being located generally inwardly from the sides of the platform, but being spaced apart so that the lower surface of the platform is exposed in the region of the longitudinal centerline; a gas within each gas bag, the gas having a density less than air, whereby the gas bags impart lift to the platform; propulsion means mounted on the platform for exerting a thrust on the platform so as to move the aircraft through the air; ducts located within the platform where they extend between the upper and lower surfaces and open out of those surfaces between the pairs of gas bags; and means within each duct for drawing air into one end of the duct and discharging it from the other end so as to exert a vertically directed force on the platform.

17. An aircraft according to claim 16 wherein each propulsion means includes a nacelle that is attached to the platform along one side of the platform and means within the nacelle for drawing air in one end of the nacelle and discharging it from the other end, whereby the nacelle exerts a thrust on the platform.

18. An aircraft according to claim 17 wherein the nacelle rotates about a horizontal axis such that the thrust derived from it may be exerted horizontally or vertically or at inclinations in between.

19. An aircraft according to claim 16 and further comprising at least one rudder mounted on the platform between two of its gas bags for controlling the direction of flight.

20. An aircraft according to claim 16 wherein the upper gas bags curve away from the upper surface and the ends of the ducts at that surface so as to function much like airfoils as air flows over them in passing into the ducts.

21. An aircraft according to claim 16 wherein the lower gas bags curve away from the lower surface and the ends of the ducts at that surface.

22. An aircraft according to claim 16 wherein the upper and lower gas bags curve away from the upper and lower surfaces respectively, and the ends of the ducts at those surfaces, so that the curved bags act as airfoils when air flows over them and into the ducts.

23. An aircraft according to claim 16 wherein the propulsion means are located along the sides of the platform.

24. An aircraft according to claim 16 and further comprising rudders mounted on the platform between the gas bags of at least one of the pairs of bags.

25. An aircraft according to claim 24 wherein the rudders are located adjacent to both ends of the platform.

26. An aircraft comprising: a rigid platform having a longitudinal centerline, sides on each side of the centerline, and ends extending between the sides, the platform having an upper surface and a lower surface, the platform being essentially hollow in the space between its upper and lower surfaces, so as to be capable of accommodating passengers or holding cargo; a pair of upper gas bags attached to the platform at its upper surface, the upper bags being located generally inwardly from the sides of the platform, but being spaced apart so that the upper surface of the platform is exposed in the region of the longitudinal centerline; a pair of lower gas bags attached to the platform at its lower surface, the lower bags being located generally inwardly from the sides of the platform, but being spaced apart so that the lower surface of the platform is exposed in the region of the longitudinal centerline; a gas within each gas bag, the gas having a density less than air, whereby the gas bags impart lift to the platform; propulsion means mounted on the platform for exerting a thrust on the platform so as to move the aircraft through the air; housings extended downwardly from the platform and located generally within the lower gas bags, landing gear attached to the platform and located within the housings, the landing gear being extensible from their housings to contact the ground below the lower gas bags.

27. An aircraft according to claim 26 wherein the housings further contain tanks for holding liquids.

* * * * *